May 1, 1923.
W. E. WINNER ET AL
SPIRIT LEVEL
Filed Feb. 16, 1921
1,453,888
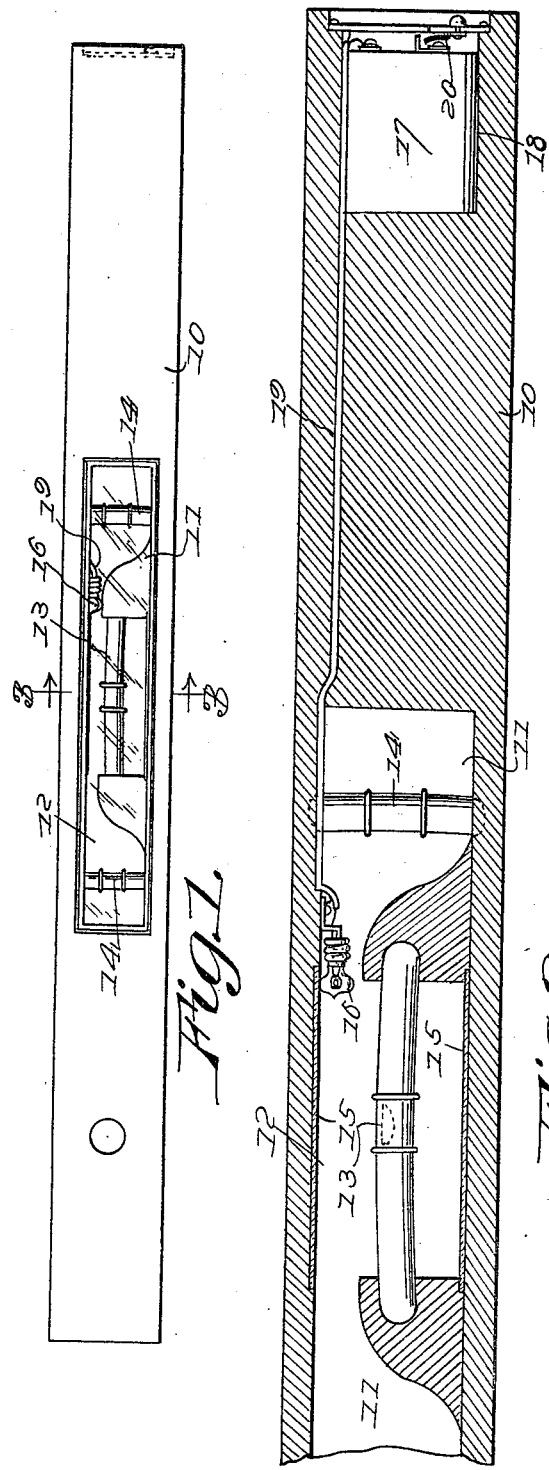
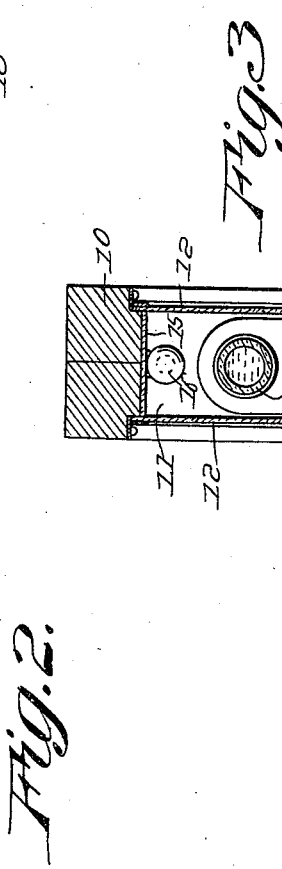
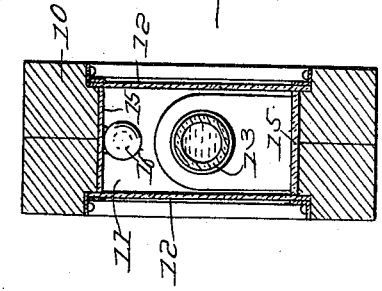
Inventors
Charles C. Patterson and
William E. Winner,
By
Attorney Patented May 1, 1923.

1,453,888

UNITED STATES PATENT OFFICE.

WILLIAM EARL WINNER AND CHARLES C. PATTERSON, OF LOWELL, MASSACHUSETTS.

SPIRIT LEVEL.

Application filed February 16, 1921. Serial No. 445,380.

*To all whom it may concern:*

Be it known that WILLIAM EARL WINNER and CHARLES C. PATTERSON, citizens of the United States of America, residing at Lowell, in the county of Middlesex and State of Massachusetts, have invented new and useful Improvements in Spirit Levels, of which the following is a specification.

The object of the invention is to provide a convertible spirit level and plumb adapted for convenient use under adverse conditions involving insufficiency of light and inaccessibility of position or where for example the instrument to be effective must be read while located at points more or less remote from the eye of the observer or where the ordinary means of furnishing light are inadequate or where the eye of the observer must be located either above or below the plane of the level or of the sight tube or bubble glass forming a member thereof, and with these objects in view the invention consists in a construction and combination of parts of which a preferred embodiment is shown in the accompanying drawing, wherein:—

Figure 1 is a view of a level constructed in accordance with the invention.

Figure 2 is a longitudinal section of the same.

Figure 3 is a transverse section on the plane indicated by the line 3—3 of Figure 1.

The apparatus consists essentially of the usual stock or bar 10 which may be of wood, metal or any suitable or preferred material having a longitudinal slot forming a sight tube or bubble glass chamber 11 protected at opposite sides by transparent panels 12 of glass or equivalent material and containing the longitudinal leveling sight tube or bubble blass 13 and the transverse plumbing sight tubes or bubble glasses 14.

Fixed in the opposite walls of the chamber above and below the plane of the leveling sight tube or bubble glass and facing the same are the mirrors 15 so that when the stock or bar of the level is either above or below the horizontal plane of the eye of the observer the reflection of the bubble glass and therefore the position of the bubble therein will be readily apparent by the reflection in one or the other of said mirrors to enable the observer to read the indication of the level with the same facility as though the bubble glass could be seen directly as under normal conditions. Also as a further means of facilitating the reading of the indications of the bubble glass a lighting unit 16 is arranged adjacent thereto and may consist as shown in the drawing of an electric light globe or bulb in circuit with a battery 17 arranged in a cavity 18 in the stock or bar, the circuit 19 which includes the battery and the globe socket also including a switch 20 which is located at one end of the stock. The lighting unit is preferably located adjacent to one end of the leveling bubble glass within the range of reflection of the mirrors so as to insure the effective illumination of the center of the bubble glass either directly or by reflection to facilitate the observation thereof.

Having described the invention what is claimed as new and useful is:—

A leveling instrument having a stock or bar having a longitudinal slot forming a bubble glass chamber, transparent panels disposed on opposite sides of the stock and enclosing said chamber, a bubble glass disposed in said chamber and in longitudinal alignment with the stock, mirrors disposed in the chamber above and below the plane of the bubble glass and facing the same so that when the stock is either above or below the horizontal plane of the eye the reflection of the bubble glass will be apparent in one or the other of said mirrors, and a lighting unit disposed in the chamber in overlapping relation to one of the mirrors and adjacent one end of the bubble glass.

In testimony whereof they affix their signatures.

CHARLES C. PATTERSON.
WILLIAM EARL WINNER.